(12) United States Patent
Wang

(10) Patent No.: US 10,025,709 B2
(45) Date of Patent: Jul. 17, 2018

(54) CONVOLUTIONAL DE-INTERLEAVER AND CONVOLUTIONAL DE-INTERLEAVING METHOD

(71) Applicant: MStar Semiconductor, Inc., Hsinchu Hsien (TW)

(72) Inventor: Chun-Chieh Wang, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/000,325

(22) Filed: Jan. 19, 2016

(65) Prior Publication Data

US 2016/0232089 A1    Aug. 11, 2016

(30) Foreign Application Priority Data

Feb. 6, 2015 (TW) .............................. 104104007 A

(51) Int. Cl.
*H03M 13/07* (2006.01)
*G06F 12/06* (2006.01)

(52) U.S. Cl.
CPC ................................ *G06F 12/0607* (2013.01)

(58) Field of Classification Search
CPC ....................... H03M 17/2732; H03M 17/276
See application file for complete search history.

(56) References Cited

U.S. PATENT DOCUMENTS

| | | | |
|---|---|---|---|
| 6,138,262 A | 10/2000 | Baek | |
| 7,051,171 B1 * | 5/2006 | Liu | G06F 11/1008 |
| | | | 345/540 |
| 7,644,340 B1 * | 1/2010 | Liu | H03M 13/2732 |
| | | | 375/262 |
| 2005/0063421 A1 * | 3/2005 | Wan | H03M 13/23 |
| | | | 370/509 |
| 2008/0256417 A1 * | 10/2008 | Andersson | H03M 13/15 |
| | | | 714/762 |

(Continued)

OTHER PUBLICATIONS

TIPO Office Action, dated Jul. 5, 2016, 4 pages.

*Primary Examiner* — Edward J Dudek, Jr.
*Assistant Examiner* — Andrew Russell
(74) *Attorney, Agent, or Firm* — Edell, Shapiro & Finnan, LLC

(57) ABSTRACT

A convolutional de-interleaver for processing multiple groups of convolutional interleaved data is provided. The groups of convolutional interleaved data include multiple sets of convolutional interleaved data formed by performing a convolutional interleaving process on multiple groups of non-interleaved data. Each set of non-interleaved data includes L sets of data, where L is a positive integer. The convolutional de-interleaver includes: an input data buffer, buffering the groups of convolutional interleaved data; a memory controller, accessing the convolutional interleaved data buffered in the input data buffer with a memory to perform a convolutional de-interleaving process, a memory address of each set of stored convolutional interleaved data being determined according to a corresponding delay depth, the value L and a delay depth difference corresponding to the set of data; and an output data buffer, buffering the multiple groups of convolutional de-interleaved data read from the memory.

6 Claims, 13 Drawing Sheets

(56) References Cited

U.S. PATENT DOCUMENTS

2011/0113305 A1* 5/2011 Liu ................... H03M 13/2707
                                                     714/773
2013/0064022 A1* 3/2013 Murphy .............. H03M 13/275
                                                   365/189.011

* cited by examiner

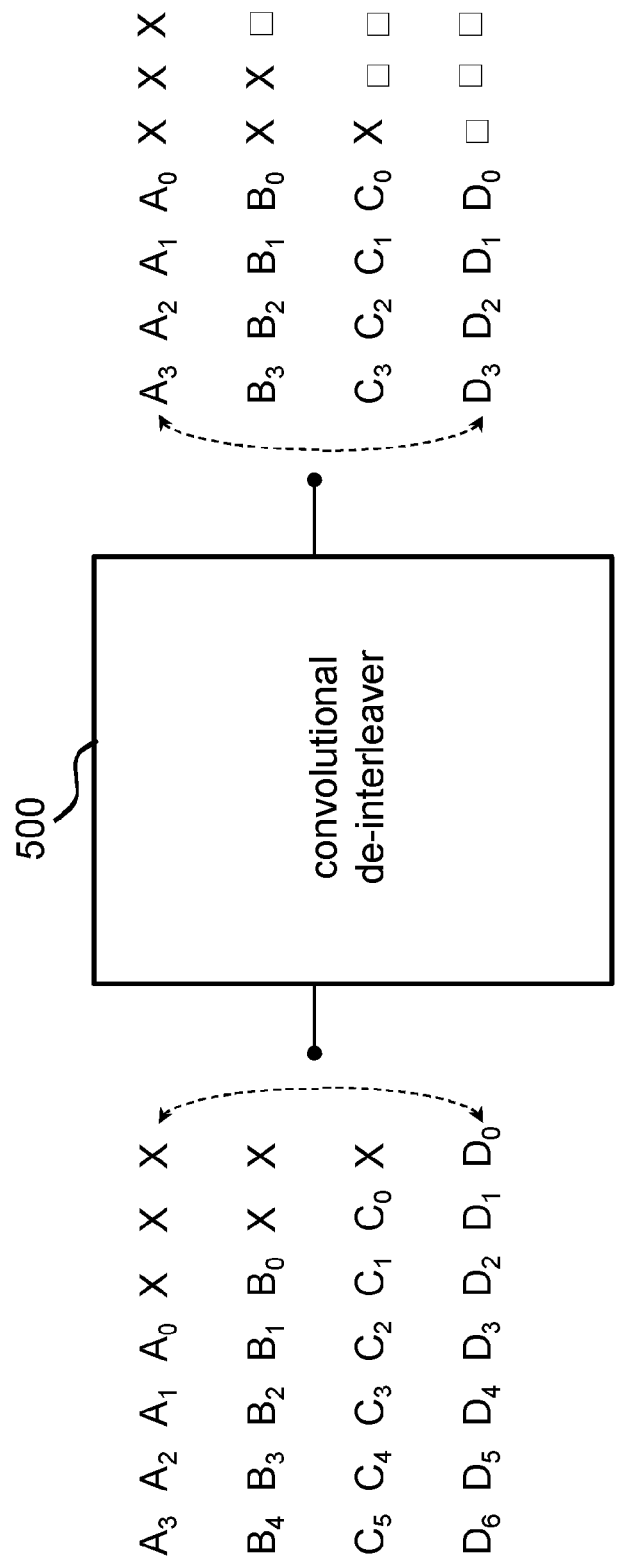

CONVOLUTIONAL DE-INTERLEAVER AND CONVOLUTIONAL DE-INTERLEAVING METHOD

This application claims the benefit of Taiwan application Serial No. 104104007, filed Feb. 6, 2015, the subject matter of which is incorporated herein by reference.

BACKGROUND OF THE INVENTION

Field of the Invention

The invention relates in general to a de-interleaver and a de-interleaving method, and more particularly to a convolutional de-interleaver and a convolutional de-interleaving method.

Description of the Related Art

In communication transmission technologies (e.g., the orthogonal frequency division multiplexing (OFDM) wireless transmission technology), in order to reinforce the resistivity of signals against interference, a time interleaving process is applied at a transmitting end, and a time de-interleaving process is applied at a receiving end. FIG. 1 shows a structure of a time interleaving process. The structure 100 includes K interleaving processing units 110, each including $n_c$ input ends and $n_c$ output ends that sequentially receive and output signals according to signal sampling clocks. As shown in FIG. 2, each of the interleaving processing units 110 includes $n_c$ paths for performing an interleaving process on signals.

The above interleaving processing unit 110 may implement a convolutional interleaving process. Referring to FIG. 3 showing the interleaving processing unit 110 according to an embodiment, between the $1^{st}$ input end and the $1^{st}$ output end is a delay $((n_c-1)D)$ of $n_c-1$ unit, between the $2^{nd}$ input end and the $2^{nd}$ output end is a delay $((n_c-2)D)$ of $n_c-2$ unit, between the $(n_c-1)^{th}$ input end the $(n_c-1)^{th}$ output end is a delay (D) of one unit, and between $n_c^{th}$ input end and the $n_c^{th}$ output end is no delay (bypass). The delay in each unit according to design requirements may be I signal periods or signal sampling clocks, where I is a positive integer. After processing the signals by the above convolutional interleaving process, the signal receiving end includes a convolutional de-interleaving structure for performing a de-interleaving process. The convolutional de-interleaving structure includes K de-interleaving processing units, each similarly sequentially receiving and outputting signals according to signal sampling clocks, and correspondingly includes a delay arrangement reverse to that of the interleaving processing units 110. As shown in FIG. 4, between the $1^{st}$ input end and the $1^{st}$ output end of the de-interleaving processing unit 410 is no delay (bypass), between the $2^{nd}$ input end and the $2^{nd}$ output end is a delay (D) of one unit, between the $(n_c-1)^{th}$ input end the $(n_c-1)^{th}$ output end is a delay $((n_c-2)D)$ of $n_c-2$ unit, and between the $n_c^{th}$ input end and the $n_c^{th}$ output end is a delay $((n_c-1)D)$ of $n_c-1$ unit.

The delay of various units in the receiving end may be realized through delay buffers. In one conventional solution, the function of delaying buffers is achieved by a static random access memory (SRAM). Although the SRAM has a fast access speed, it disfavors cost effects as being quite costly. In another conventional solution, a shared system memory is utilized to realize the function of delaying buffers. A system memory, usually a synchronous dynamic random access memory (SDRAM), has a lower cost and thus saves hardware costs. However, in this conventional solution, data is sequentially written into the SDRAM according to a receiving sequence of the data (i.e., memory addresses written at earlier time points are also sooner over-written). It should be noted that, due to the convolutional interleaving process at the transmitting end, the receiving sequence is not arranged according to the continuity of data. Thus, to restore the continuity of data during the convolutional de-interleaving process, the above conventional solution is required to read data from memory addresses at different rows. That is to say, because of the structure and access method of the SDRAM, when multiple sets of data to be de-interleaved is stored in different row regions in the SDRAM, a pre-charge operation needs to be performed after completing the first read operation to shut down the row address region corresponding to the first read operation, and then a row active operation is performed to open the row address region corresponding to the second read operation. As such, when multiple sets of data is interleavingly stored in different row regions, the additional pre-charge and row active operations inevitably consume tremendous access time due to the constant row access changes. In conclusion, such conventional solution not only needs a longer convolutional de-interleaving processing time, but also affects memory bandwidths of other circuits accessing the system memory.

SUMMARY OF THE INVENTION

In view of issues of the prior art, the invention is directed to a convolutional de-interleaver and a convolutional de-interleaving method.

The present invention discloses a convolutional de-interleaver for processing a plurality of groups of convolutional interleaved data including a plurality of sets of convolutional interleaved data. The plurality of sets of convolutional interleaved data is formed by performing a convolutional interleaving process on a plurality of groups of non-interleaved data. Each of the plurality of groups of non-interleaved data includes L sets of data, where L is a positive integer. Two successive sets of each of the plurality of groups of non-interleaved data correspond to a delay depth difference after the convolutional interleaving process. According to an embodiment, the convolutional de-interleaver includes: an input data buffer, that buffers the plurality of groups of convolutional interleaved data; a memory controller, that accesses the plurality of groups of convolutional interleaved data buffered in the input data buffer with a memory to perform a convolutional de-interleaving process, a memory address of each set of convolutional interleaved data stored is determined according to a corresponding delay depth, the value L and the delay depth difference; and an output data buffer, that buffers the plurality of groups of convolutional de-interleaved data read from the memory.

The present invention further discloses a convolutional de-interleaver for processing a plurality of groups of convolutional interleaved data including a plurality of sets of convolutional interleaved data. According to an embodiment, the convolutional de-interleaver includes: an input data buffer, that buffers the plurality of groups of convolutional interleaved data; a memory controller, that accesses the plurality of groups of convolutional interleaved data buffered in the input data buffer with a memory to perform a convolutional de-interleaving process to obtain a plurality of groups of convolutional de-interleaved data, the memory controller storing a plurality of sets of data of the plurality of sets of convolutional interleaved data corresponding to the same group of convolutional de-interleaved data of the plurality of groups of convolutional de-interleaved data to a plurality of same row accessing memory units in the memory; and an output data buffer, that buffers the plurality of groups of convolutional de-interleaved data read from the memory.

The present invention further discloses a convolutional de-interleaving method for processing a plurality of groups of convolutional interleaved data including a plurality of sets of convolutional interleaved data. According to an embodiment, the convolutional de-interleaving method includes: accessing the plurality of groups of convolutional interleaved data with a memory to perform a convolutional de-interleaving process to obtain a plurality of groups of convolutional de-interleaving data. A plurality of sets of data of the plurality of sets of convolutional interleaved data corresponding to the same group of convolutional de-interleaved data of the plurality of groups of convolutional de-interleaved data is stored in a plurality of same row accessing memory units in the memory.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 6b is a schematic diagram of a convolutional de-interleaver processing convolutional interleaved data to output convolutional de-interleaved data according to an embodiment of the present invention;

FIG. 7 is a schematic diagram of a memory access controller storing data to a DRAM according to an embodiment of the present invention;

FIG. 8 is a schematic diagram of a conventional memory access controller storing data to a DRAM;

DETAILED DESCRIPTION OF THE INVENTION

The present invention discloses a convolutional de-interleaver and a convolutional de-interleaving method, which perform de-interleaving by a dynamic random access memory (DRAM) to save hardware costs, and reduce the number of row access changes of a memory through appropriately selecting memory addresses for data access to further improve the performance.

Figure 1:
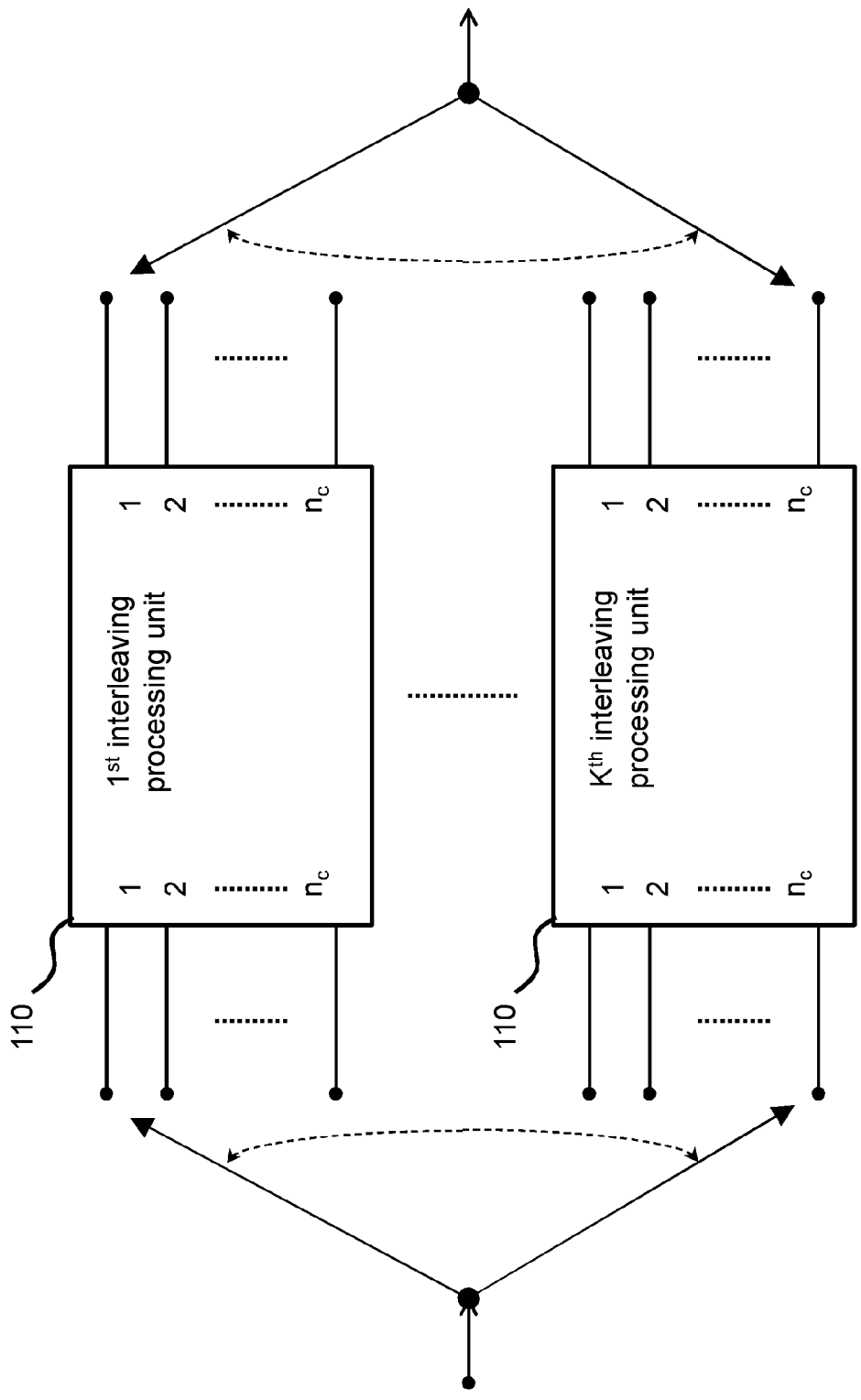
FIG. 1 is a schematic diagram of a structure of a time interleaving process.
Figure 2:
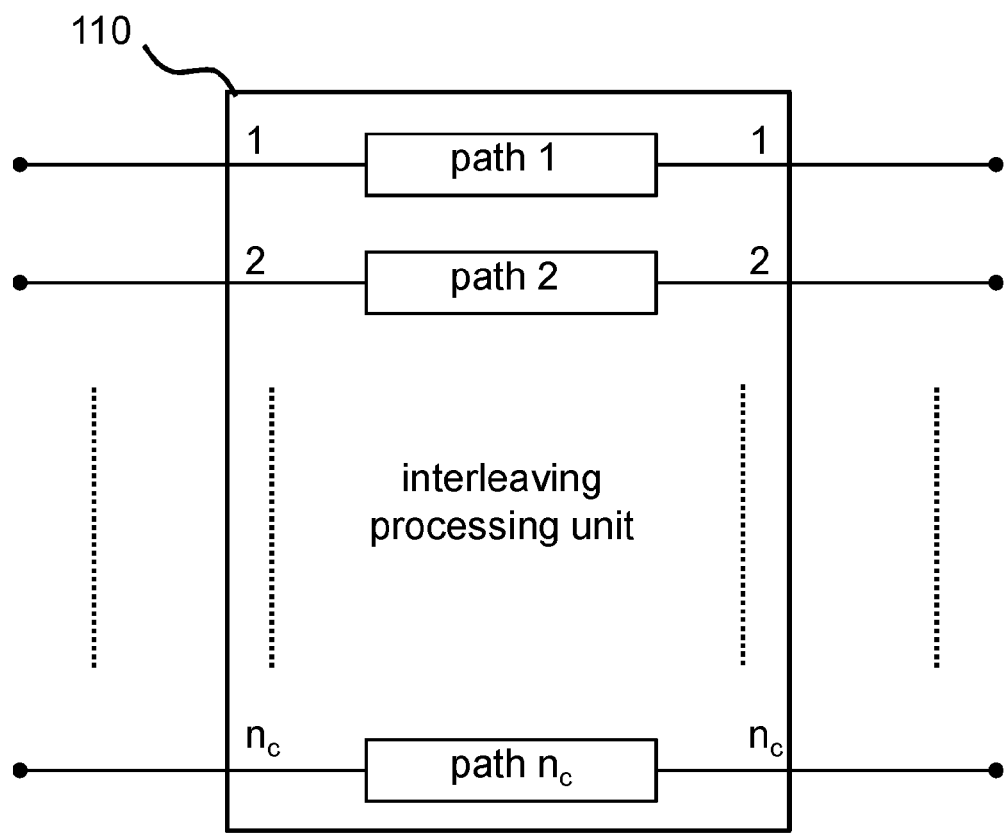
FIG. 2 is a schematic diagram of an interleaving processing unit in FIG. 1.
Figure 3:
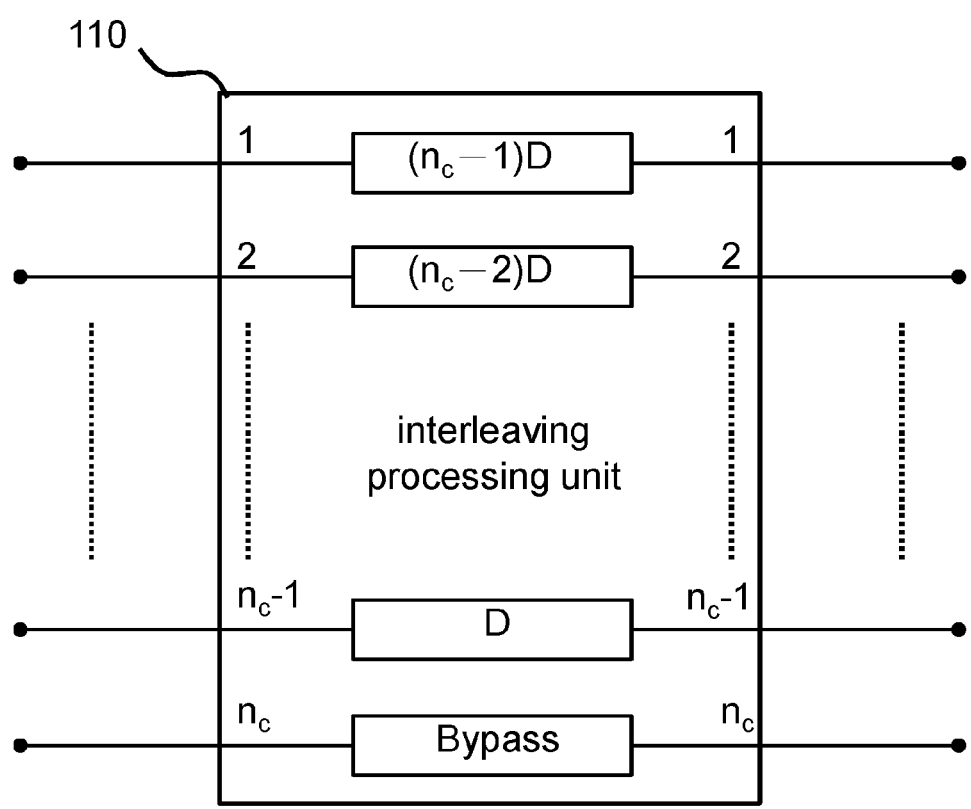
FIG. 3 is a schematic diagram of an interleaving processing unit adopting convolutional interleaving.
Figure 4:
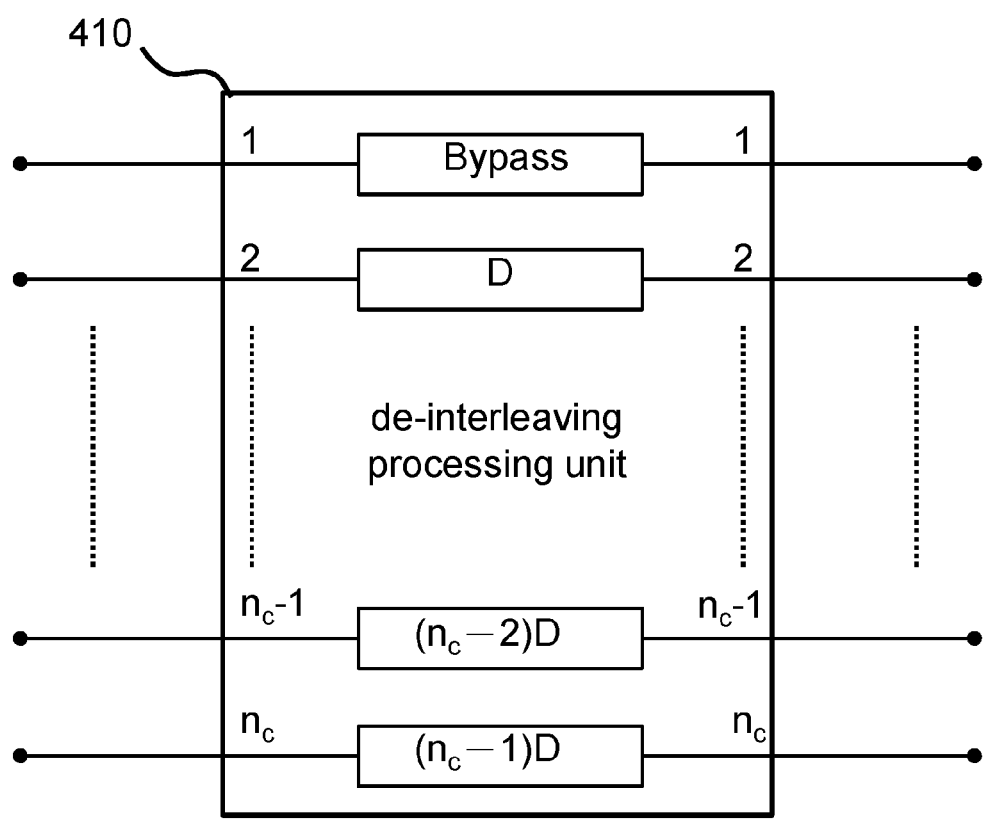
FIG. 4 is a schematic diagram of a convolutional de-interleaving unit adopting convolutional de-interleaving.
Figure 5:
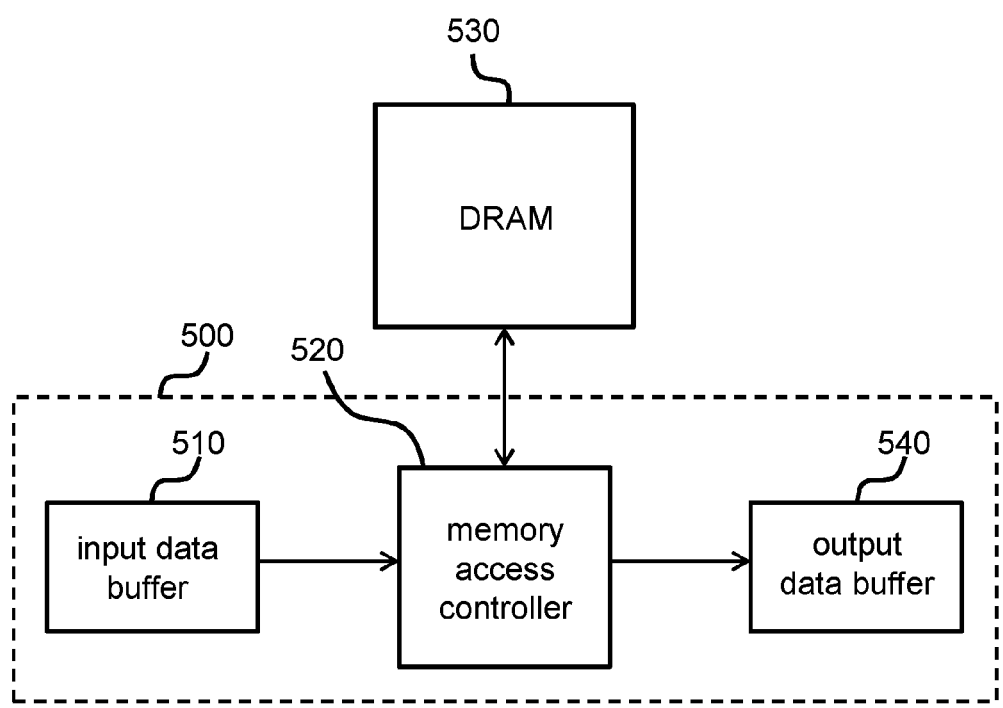
FIG. 5 is a schematic diagram of a convolutional de-interleaver according to an embodiment of the present invention.

FIG. 5 shows a schematic diagram of a convolutional de-interleaver according to an embodiment of the present invention. As shown in FIG. 5, a convolutional de-interleaver 500 according to an embodiment includes an input data buffer 510, a memory access controller 520 for controlling data access of a DRAM 530 (e.g., a synchronous dynamic random access memory (SDRAM)), and an output data buffer 540. For example, the input data buffer 510 is a first-in-first-out (FIFO) buffer or an equivalent device, and receives and outputs a plurality of groups of convolutional interleaved data to the DRAM 530, hence serving as an input data buffer when the memory access controller 520 performs a de-interleaving operation. The groups of convolutional interleaved data are formed by performing a convolutional interleaving process on a plurality of groups of non-interleaved data. Each of the groups of non-interleaved data includes L sets of data, i.e., a $J^{th}$ group of data of the groups of non-interleaved data includes L successive sets of data. The L sets of data corresponds to L different delay depth (or referred to as delay periods), respectively. A delay depth difference of two successive sets of data in the same group of non-interleaved data is I operation clocks (e.g., data sampling clocks or data signal periods). L, J and I are positive integers. J corresponds to a group transmitting sequence of the groups of non-interleaved data (or a group receiving sequence of the groups of convolutional interleaved data). A maximum of the L delay depths is $[(L-1) \times I+Q]$ operation clocks, where Q is an integer not smaller than 0 and represents a minimum of the L delay depths. The output data buffer 540 may be a FIFO buffer or an equivalent device, and receives a plurality of groups of convolutional de-interleaved data from the DRAM 530, hence serving as an output data buffer when the memory access controller 520 performs the de-interleaving operation.

Figure 6A:
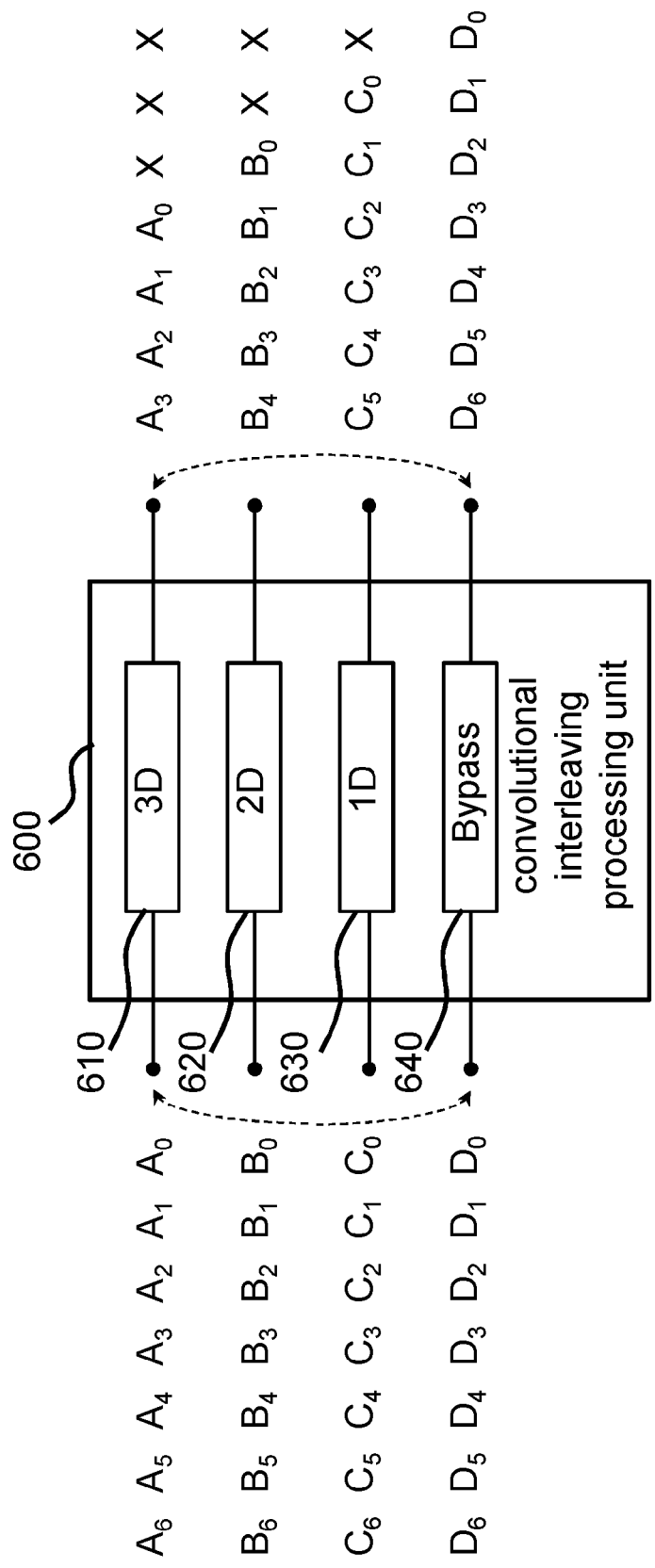
FIG. 6a is a schematic diagram of a conventional convolutional interleaving processing unit processing non-interleaved data to output convolutional interleaved data.

For example, referring to FIG. 6a, according to the transmitting sequence, the plurality of groups of non-interleaved data includes $(A_0, B_0, C_0, D_0)$, $(A_1, B_1, C_1, D_1)$, $(A_2, B_2, C_2, D_2)$, $(A_3, B_3, C_3, D_3)$, $(A_4, B_4, C_4, D_4)$, $(A_5, B_5, C_5, D_5)$ and $(A_6, B_6, C_6, D_6)$. Each of the groups of data includes 4 (i.e., the value L) sets of data, wherein the subscript indicates the group number (i.e., the value J) of data, and A, B, C and D respectively correspond to different sets of data and different transmission paths of the delay depths of 3, 2, 1 and 0 unit. For example, each unit of the delay depth is 1 operation clock, and the delay depth difference corresponding to two successive sets of data (e.g., $A_J$ and $B_J$) in the same group of non-interleaved data is 1 (i.e., the value I) operation clock. After processes of four transmission paths 610, 620, 630 and 640 of the convolutional interleaving processing unit 600 (including four delay depths in 3, 2, 1, and 0 unit (3D, 2D, 1D and bypass)), the non-interleaved data becomes a plurality of sequential groups of convolutional interleaved data $(x, x, x, D_0)$ (where x refers to data received earlier in the receiving sequence), $(x, x, C_0, D_1)$, $(x, B_0, C_1, D_2)$, $(A_0, B_1, C_2, D_3)$, $(A_1, B_2, C_3, D_4)$, $(A_2, B_3, C_4, D_5)$, and $(A_3, B_4, C_5, D_6)$.

As previously described, in order to restore the continuity of data (i.e., to restore the convolutional interleaved data to non-interleaved (de-interleaved) data), the memory access controller 520 performs de-interleaving in response to the four delay depths of 3, 2, 1 and 0 unit corresponding to the convolutional interleaving processing unit 600 (or an equivalent unit). FIG. 6b shows a schematic diagram of the convolutional de-interleaver 500 for processing convolutional interleaved data to output convolutional de-interleaved data according to an embodiment of the present invention. The convolutional interleaved data having undergone a delay depth of 3 units is directly bypassed (i.e., outputted without delay given that the minimum delay depth Q is 0, or else all convolutional interleaved data is delayed before being outputted if Q is not 0). The remaining convolutional interleaved data is delayed and outputted (i.e., non-bypassed). At this point, the memory access controller 520 determines the memory address at which the delayed convolutional interleaved data outputted is stored in the DRAM 530. The memory address of each set of convolutional interleaved data stored is associated with the delay depth (in this example, a delay depth of 3, 2 or 1 unit) corresponding to the set of data, the value L (the number of sets of data in one group or a total number of delay depths, being 4 in this example), the value J (the group number of non-interleaved data, indicated by the subscript in this example), and the value I (the delay depth difference, being 1 in this example). More specifically, as shown in FIGS. 5 to 6b, the plurality of groups of convolutional interleaved data (x, x, x, $D_0$), (x, x, $C_0$, $D_1$), (x, $B_0$, $C_1$, $D_2$), ($A_0$, $B_1$, $C_2$, $D_3$), ($A_1$, $B_2$, $C_3$, $D_4$), ($A_2$, $B_3$, $C_4$, $D_5$), and ($A_3$, $B_4$, $C_5$, $D_6$) outputted by the convolutional interleaving processing unit 600 at the transmitting end is sequentially inputted into the convolutional de-interleaver 500 at the receiving end, and is accessed by the memory access controller 520. In each group of data, the first set of data (in this example, x, x, x, $A_0$, $A_1$, $A_2$ and $A_3$ in FIG. 6, corresponding to the part having a minimum delay depth of 0 unit at the receiving end and corresponding to the part having a maximum delay depth at the transmitting end) is directly outputted to the output data buffer 540, whereas the remaining data can be sequentially accessed from (L−1)×(L−1) data storage units in the DRAM 530 (or (L−1)×(L−1) data storage units of L×L units, with each unit storing one set of convolutional interleaved data, where the subtrahend 1 represents the data in the same group of interleaved data that is directly outputted instead of being stored, and is (L−1)×(L−1)=3×3 in this example).

Figure 7:
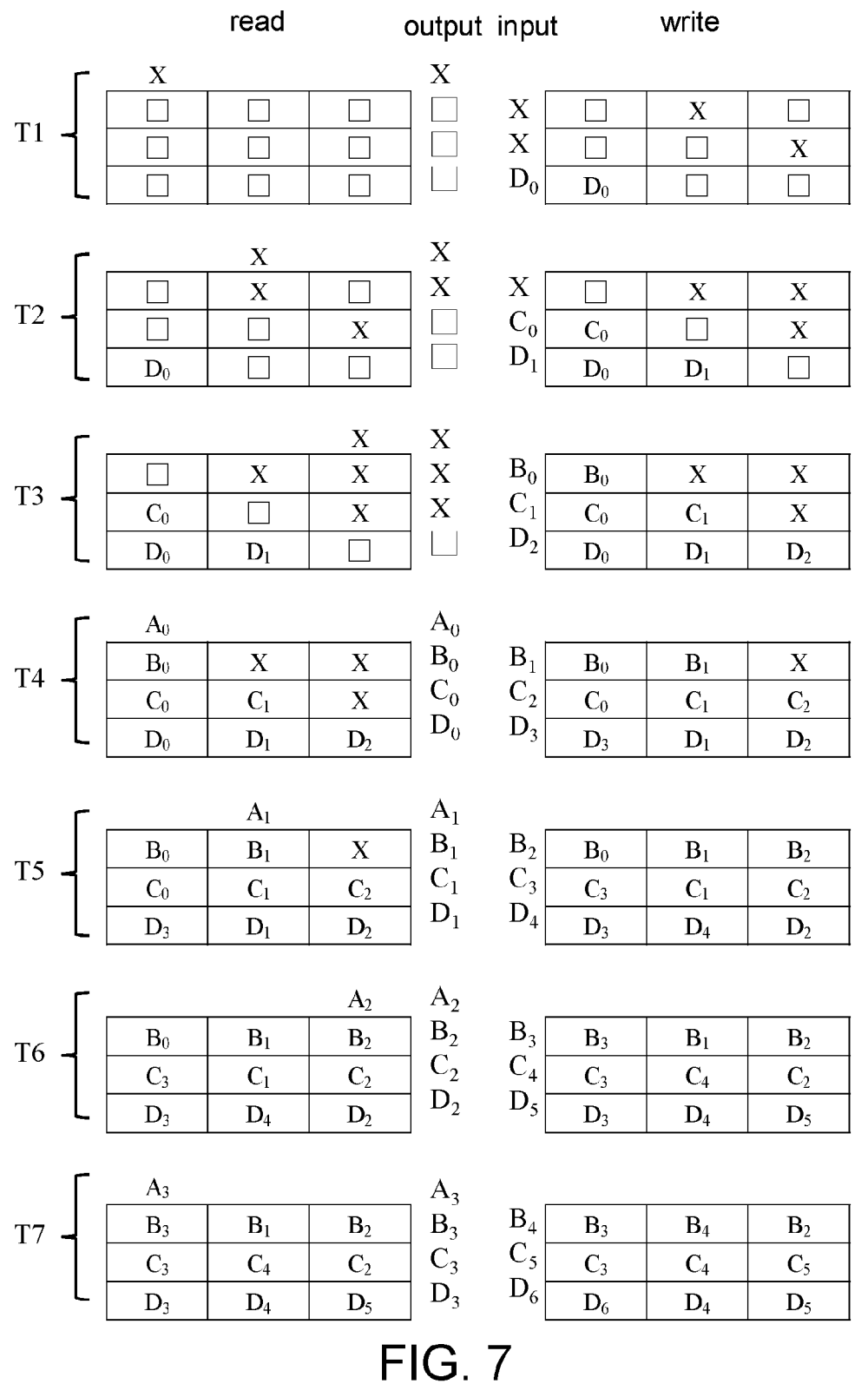

Referring to FIG. 7, in a $1^{st}$ time unit (e.g., a period or including a plurality of time points) T1, the $1^{st}$-column data (□, □, □) (where □ is data having an earlier storage sequence) in the 3×3 data storage units is read out and aligned with the $1^{st}$ set of data "x" of the $1^{st}$ group of interleaved data in the inputted data, and the two jointly serves as a $1^{st}$ group of de-interleaved data (x, □, □, □) and is outputted. The remaining sets of data (x, x, $D_0$) of the $1^{st}$ group of interleaved data in the inputted data is written, and corresponds to the rows of predetermined storage positions of the sets of data B, C and D.

In a $2^{nd}$ time unit T2, the $2^{nd}$-column data (x, □, □) in the 3×3 data storage units is read out and aligned with the $1^{st}$ set of data "x" of the $2^{nd}$ group of interleaved data in the inputted data, and the two jointly serves as a $2^{nd}$ group of de-interleaved data (x, x, □, □) and is outputted. The remaining sets of data (x, $C_0$, $D_1$) of the $2^{nd}$ group of interleaved data in the inputted data is written, and corresponds to the rows of the predetermined storage positions of the sets of data B, C and D.

In a $3^{rd}$ time unit T3, the $3^{rd}$-column data (x, x, □) in the 3×3 data storage units is read out and aligned with the $1^{st}$ set of data "x" of the $3^{rd}$ group of interleaved data in the inputted data, and the two jointly serves as a $3^{rd}$ group of de-interleaved data (x, x, x, □) and is outputted. The remaining sets of data ($B_0$, $C_1$, $D_2$) of the $3^{rd}$ group of interleaved data in the inputted data is written, and corresponds to the rows of the predetermined storage positions of the sets of data B, C and D.

In a $4^{th}$ time unit T4, the $4^{th}$-column data ($B_0$, $C_0$, $D_0$) in the 3×3 data storage units is read out and aligned with the $1^{st}$ set of data "$A_0$" of the $4^{th}$ group of interleaved data in the inputted data, and the two jointly serves as a $4^{th}$ group of de-interleaved data ($A_0$, $B_0$, $C_0$, $D_0$) and is outputted. The remaining sets of data ($B_1$, $C_2$, $D_3$) of the $4^{th}$ group of interleaved data in the inputted data is written, and corresponds to the rows of the predetermined storage positions of the sets of data B, C and D. The remaining $5^{th}$ to $7^{th}$ time units T5 to T7 and access details of subsequent time units can be deduced from the above description.

In continuation, the data $A_J$ corresponding to 3 delay depths is directly outputted, the storage address of the data $B_J$ corresponding to 2 delay depths is located at the {[J mod(L−1)]×I+1}$^{th}$ position (where mod represents a remainder operation) at the $1^{st}$ row in the 3×3 data storage unit, the storage position of the data $C_J$ corresponding to 1 delay depth is located at the {[J mod(L−1)]×I+1}$^{th}$ position at the $2^{nd}$ row in the 3×3 data storage unit, and the storage position of the data $D_J$ corresponding to 0 delay depth is located at the {[J mod(L−1)]×I+1}$^{th}$ position at the $3^{rd}$ row in the 3×3 data storage unit. The number of row at which each set of data is located is the value of the maximum delay depth (3 in this example) subtracted by the value of the delayed depth of the set of data. According to the above, in the embodiment, the data at each access address is read out before being overwritten, the behavior of delaying a buffering element is simulated through the additionally reserved storage units, read addresses and written addresses that are interleaved, and the accessed addresses are aligned with the access addresses of the same column. It should be noted that the descriptive terms "column", "row" and "position" are for indicating relationships among the access addresses, and are not to be construed as limitations to physical circuit relationships of the memory 530.

It should be noted that, before the memory access controller 520 stores first convolutional interleaved data (e.g., the data $C_2$ in FIG. 7), second convolutional interleaved data (e.g., the data $C_0$ in FIG. 7) is read out. The first and second convolutional interleaved data belongs to the data outputted from delaying the plurality of sets of convolutional interleaved data, corresponds to the same delayed depth, and is stored at different addresses (as shown in FIG. 7) in the DRAM 530. Further, after the memory access controller 520 reads out the second convolutional interleaved data and before the memory access controller 520 writes in the first convolutional interleaved data, the delay depths corresponding to the n sets of convolutional interleaved data read out (e.g., the data $D_0$ in FIG. 7, and the first and second convolutional interleaved data at this point is $C_2$ and $C_0$) are different from the delay depths corresponding to the first and second convolutional interleaved data, where n is an integer not smaller than 0.

Figure 8:
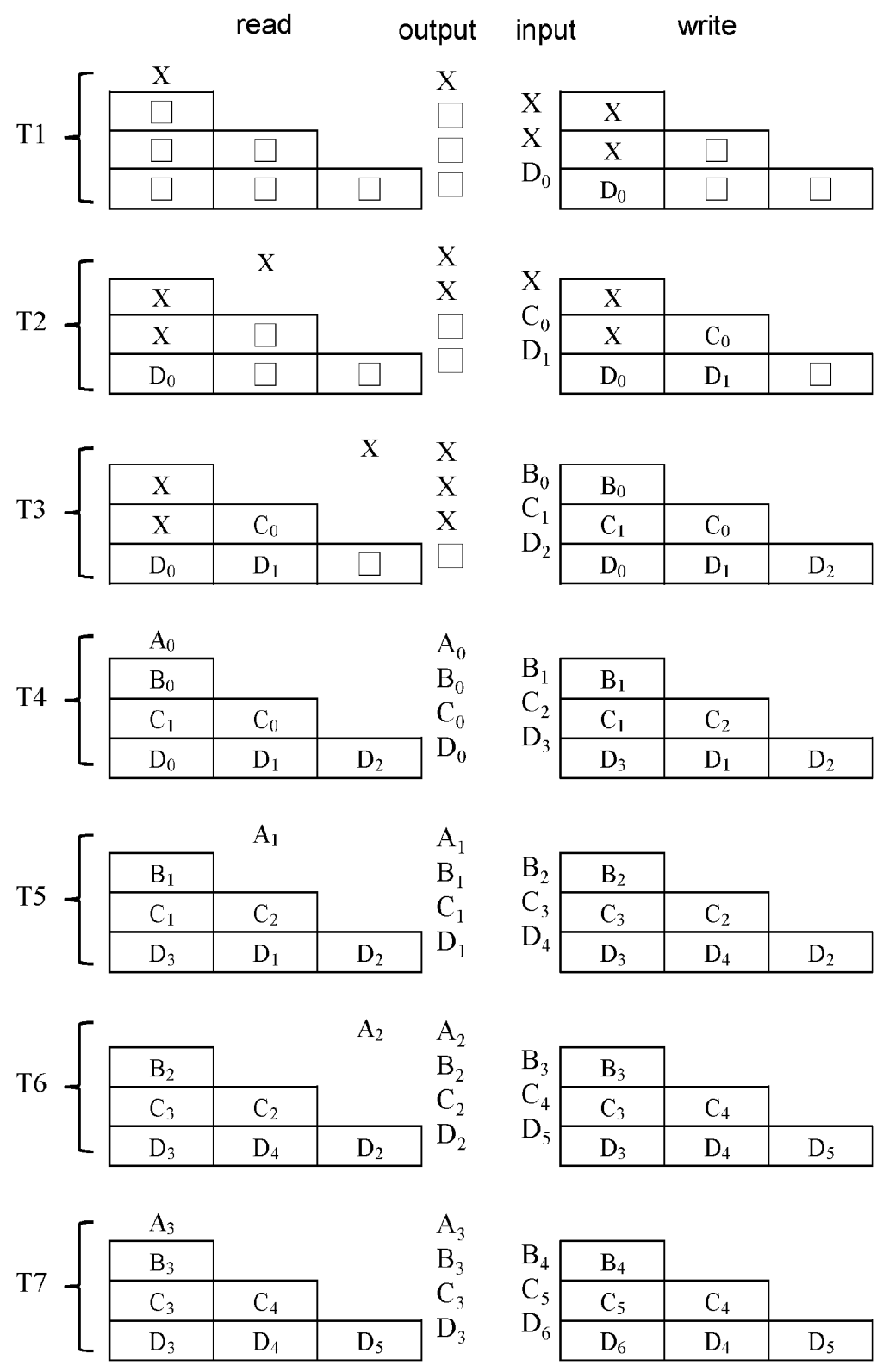

To better understand the differences between the present invention and the prior art, FIG. 8 shows a conventional memory access approach, in which the data $A_J$ in the plurality of groups of convolutional interleaved data (x, x, x, $D_0$), (x, x, $C_0$, $D_1$), (x, $B_0$, $C_1$, $D_2$), ($A_0$, $B_1$, $C_2$, $D_3$), ($A_1$, $B_2$, $C_3$, $D_4$), ($A_2$, $B_3$, $C_4$, $D_5$), and ($A_3$, $B_4$, $C_5$, $D_6$) same as in FIG. 7 is directly outputted, whereas the remaining data is successively accessed according to memory addresses. In other words, according to the implementation of known technologies, in the same time unit (e.g., any of the time units T1 to T7 in FIG. 8), a conventional solution first performs a read operation and then a write operation on the same access position for data stored at the access addresses to simulate the behavior of delaying a buffering element.

Thus, according to the implementation approach of known technologies, positions of rows and columns of all read addresses are changed along with the write addresses. Such details are known to one person skilled in the art, and shall be omitted herein.

Figure 9:
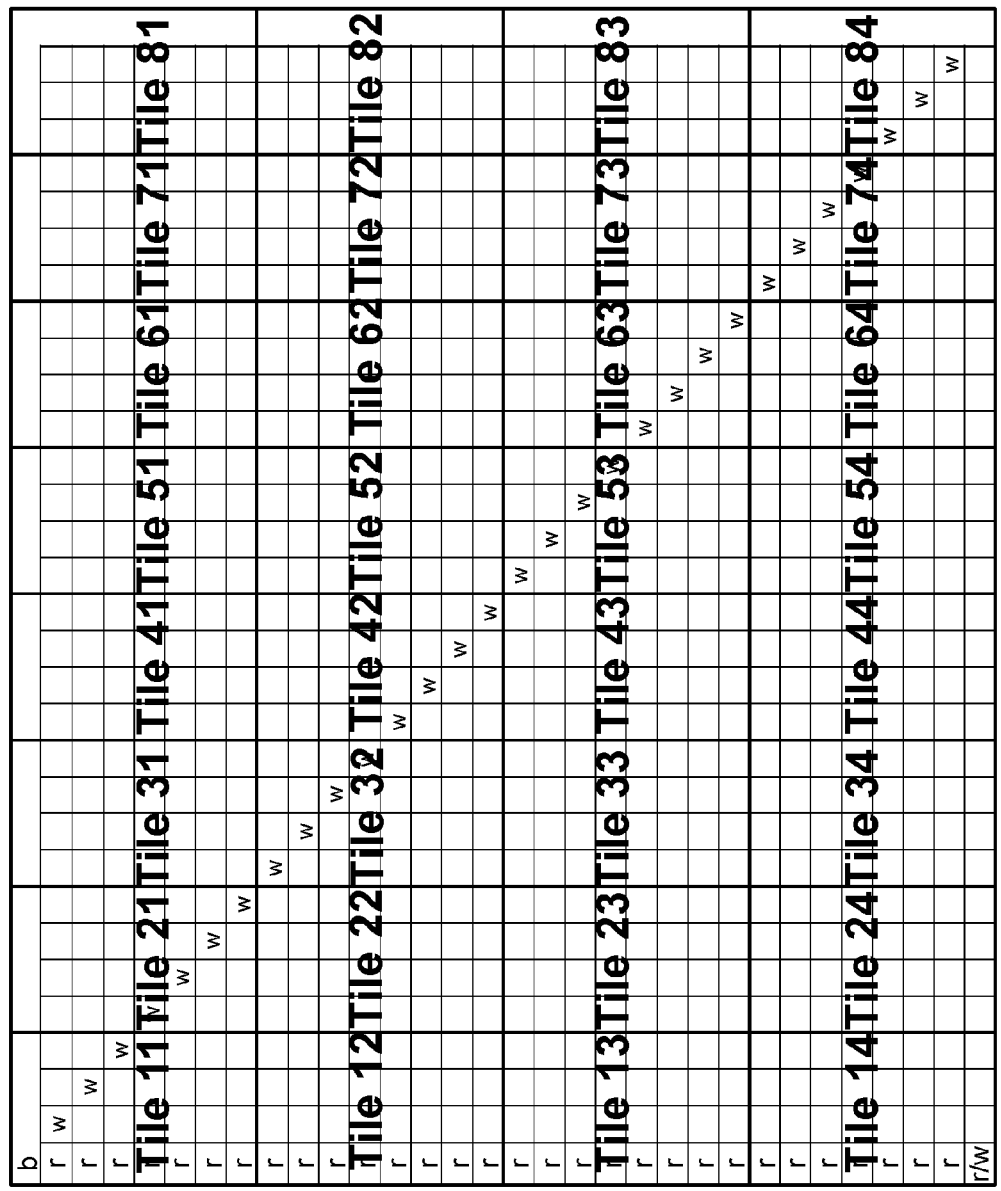
FIG. 9 is a schematic diagram of memory access control according to an embodiment of the present invention.

In practice, the number of sets of data in each group of convolutional interleaved/de-interleaved data (alternatively, the $J^{th}$ group of convolutional interleaved/de-interleaved data) is usually greater than the number of sets in the foregoing example. Taking FIG. 9 for instance, when the number of sets of data in each group is 32 (i.e., L=32), the minimum and the maximum delay depths are delays of 0 and 31 units, respectively, and the delay depth difference between two successive sets of data is a delay of 1 unit (i.e., I=1). According to the present invention, the data storage units of the SDRAM for storing data may be (L−1)×(L−1)= 31×31 units (alternately, 31×31 units in L×L=32×32 units). Under the above setting, in the present invention, before the (L−1)=31 sets of data of the $J^{th}$ group of convolutional interleaved data is written (denoted as w in FIG. 9), from the $J^{th}$ group of convolutional interleaved data, one set (denoted as b in FIG. 9, and also belonging to the $J^{th}$ group of convolutional de-interleaved data) is directly outputted, and (L−1)=31 sets of convolutional interleaved data (denoted as r in FIG. 9) is read out. Thus, these 32 sets of data is regarded as one group of convolutional de-interleaved data and outputted. Assume that the maximum depth of same row accessing of the SDRAM is L=32 (i.e., 32 sets of data can be accessed at the same row without performing a row access change), and the 32 sets of data of the same row is accommodated in the same row access memory unit (referred to as a tile, including 4×8=32 data storage units). Accordingly, 4×8 tiles (e.g., Tile 11, Tile 12, . . . , Tile 83, and Tile 84 defined by bold frames in FIG. 9) in FIG. 9 are needed to perform data access. At this point, the number of row access changes required for outputting the $J^{th}$ group of convolutional de-interleaved data is 4 (i.e., the value r, including Tiles 11, 12, 13 and 14). Further, the number of row access changes for writing (L−1)=31 sets of convolutional interleaved data as (L−1) sets of convolutional de-interleaved data of another different group of convolutional de-interleaved data subsequently read out is 9 (i.e., the value w, including Tiles 11, 21, 32, 42, 53, 63, 74, 84 and 14). Thus, in the access operation for generating the $J^{th}$ group of convolutional de-interleaved data in the present invention, the total number of row access changes is 4+9=13 times. Each of the same row accessing memory units stores a part of the convolutional interleaved data corresponding to the $J^{th}$ group of convolutional de-interleaved data, and the transmitting sequences of those parts of the convolutional interleaved data are continuous.

It should be noted that, in the above example, L×L=32×32 data storage units form M (4×8=32) tiles, with each tile storing (L×L/M)=32×32/32=32 sets of convolutional interleaved data. Wherein, N=32/8=4 tiles can be utilized by the memory access controller (e.g., the controller 520 in FIG. 5) to read (L−1)=31 sets of convolutional interleaved data of the $J^{th}$ group of convolutional interleaved data. Further, before the 31 sets of convolutional interleaved data is read, [(L/N)−1]=[(32/4)−1]=7 sets of the data is stored in the same row accessing memory units (as Tile 11 in FIG. 9). Further, (N−1)L/N=(4−1)32/4=24 sets of data is evenly stored in (N−1)=3 same row accessing memory units (as Tiles 12, 13 and 14 in FIG. 9). It should be noted that, again referring to FIG. 9, for the reading sequence of data, the $1^{st}$ set of the 32 sets of the $J^{th}$ group of convolutional de-interleaved data is directly outputted, whereas the $k^{th}$ set of the remaining 31 sets is read from the $(x_r, y_r)^{th}$ tile, where k is an integer between 1 and (L−1), $x_r$ represents a lateral position of the tile (i.e., $x_r$ is an integer between 1 and $L/T_C$ ($L/T_C$=32/4=8 in this example)) when data is read, $y_r$ represents a longitudinal position of the tile (i.e., $y_r$ is an integer between 1 and L/TR ($L/T_R$=32/8/4 in this example) when data is read. More specifically, $x_r$=int{{[J mod(L−1)]×I}/$T_C$ }+1, $y_r$=int(k/$T_R$+ 1, where int refers to an integer operation. Further, for the receiving sequence of data, the $1^{st}$ set of L=32 sets of the $J^{th}$ group of convolutional interleaved data (also the $1^{st}$ set of the $J^{th}$ group of convolutional de-interleaved data at the same time) is directly outputted, whereas the $k^{th}$ set of the remaining (L—1)=31 sets of data is stored in the $(x_w, y_w)^{th}$ tile, wherein $x_w$ represents a lateral address of the tile when data is written (i.e., $x_w$ is an integer between 1 and $L/T_C$=32/ 4=8), and $y_w$ represents a longitudinal position of the tile when data is written (i.e., $y_w$ is an integer between 1 and $L/T_R$=32/8=4). More specifically, $x_w$=int{[k+{[J mod(L− 1)×I}]/$T_C$}+1, $y_w$=int(k/$T_R$)+1. It should be noted that, the values of ranges of the parameters J, L, k, 1, $T_R$ and $T_C$, as well as the division and starting points of the tiles, are examples for better understanding the present invention. One person skilled in the art may determine the values of these parameters and the arrangement and planning of the tiles according to actual needs.

Figure 10:
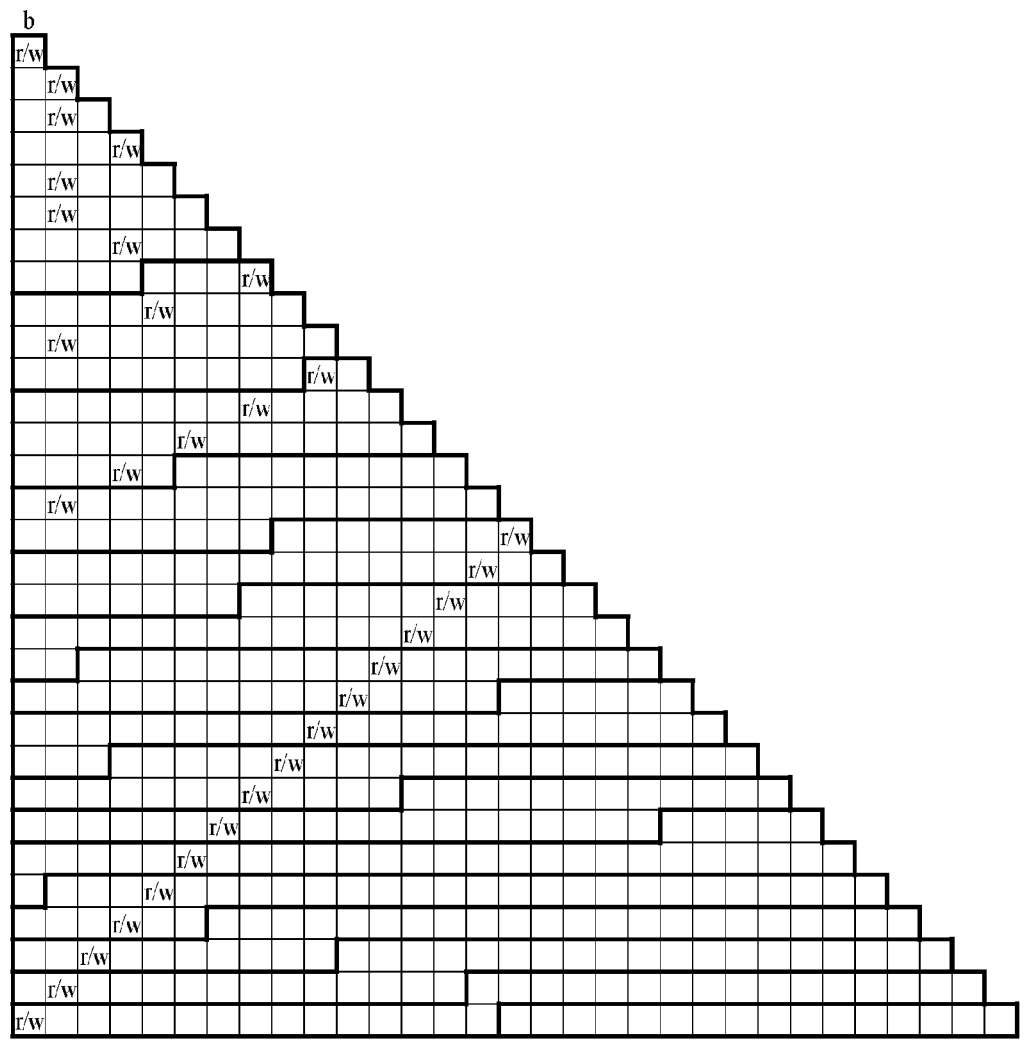
FIG. 10 is a schematic diagram of conventional memory access control.

In continuation, under the same settings of the number of groups of data, the delay depths and the delay depth differences, an access condition of a conventional solution is as shown in FIG. 10. As seen from FIG. 10, the conventional solution utilizes 16 tiles (each having a size of also 32 data storage units, with the shape being illustrative only) to perform data access, and requires 15 number of times of row access changes for outputting the $J^{th}$ group of convolutional de-interleaved data (i.e., including r number of tiles), and also 15 number of times of row access changes for writing convolutional interleaved data as another different group of convolutional de-interleaved data to be subsequently read out (i.e., including w number of tiles). Thus, in the access operation for generating the $J^{th}$ group of convolutional de-interleaved data of the conventional solution, the total number of row access changes is 15+15=30 times, which is far larger than 13 times of the present invention, hence clearly indicating that the present invention provides performance far better than that of the conventional solution. Details of the data access shown in FIG. 10 are generally known in the technical field, and shall be omitted herein.

Figure 11:
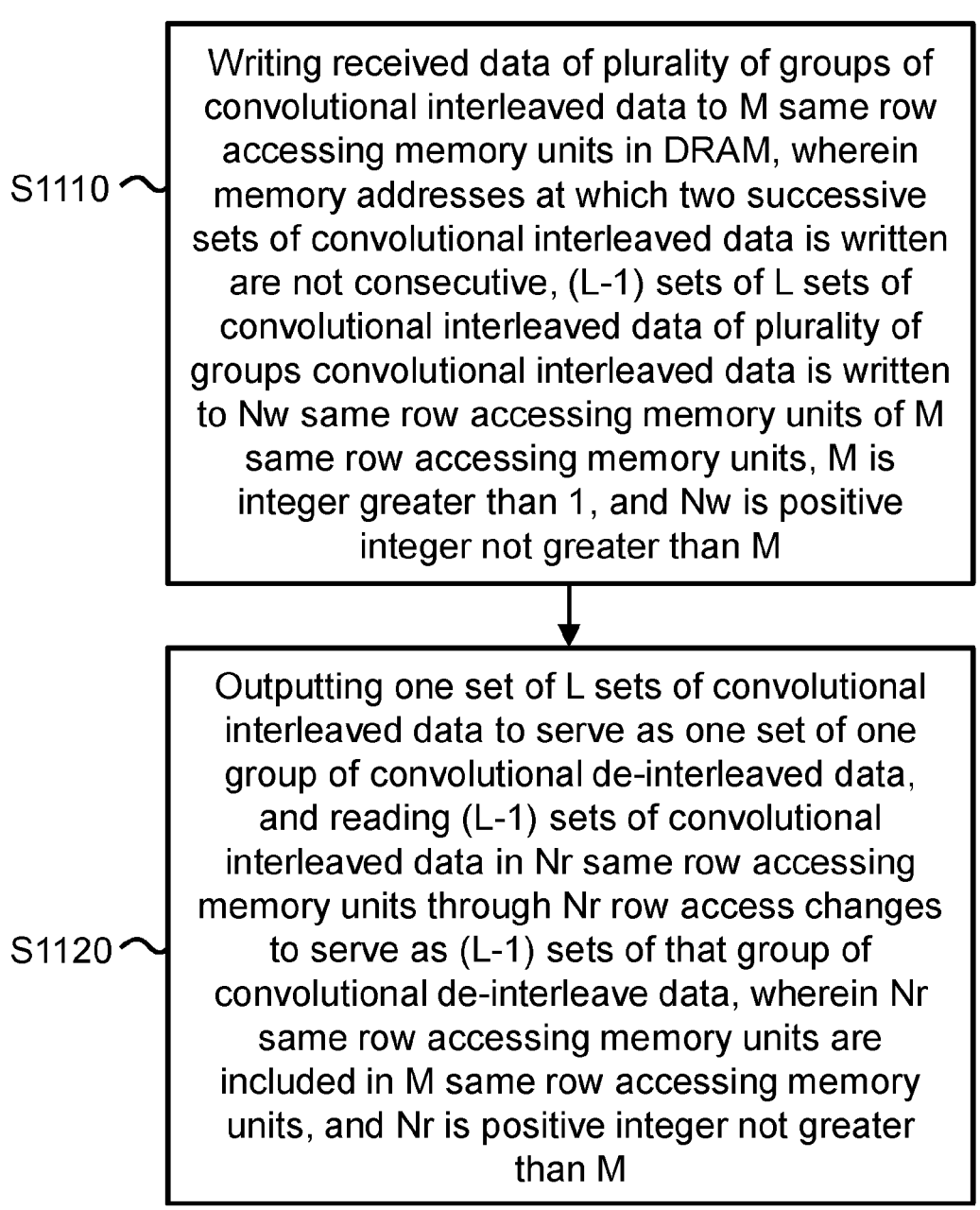
FIG. 11 is a schematic diagram of a convolutional de-interleaving method according to an embodiment of the present invention.

In addition to the above device, the present invention further discloses a convolutional de-interleaving method for processing a plurality of groups of convolutional interleaved data by M same row accessing memory units of a DRAM. Similarly, the plurality of groups of convolutional interleaved data is formed by performing a convolutional interleaving process on a plurality of groups of non-interleaved data. Each of the groups of non-interleaved data includes L sets of data. The $J^{th}$ group of the plurality of groups of non-interleaved data includes L consecutive sets of data, the L sets of the $J^{th}$ group of data corresponds to L different delay depths, respectively, L and J are positive integers, and the value of J corresponds to a group transmitting sequence of the plurality of groups of non-interleaved data. Under the above setting, a method according to an embodiment includes following steps, as shown in FIG. 11.

In step S1110, received data of the plurality of groups of convolutional interleaved data is written to the M same row accessing memory units in the DRAM. Wherein, the memory addresses at which two successive sets of convolutional interleaved data is written are not consecutive, and (L−1) sets of the L sets of convolutional interleaved data of the plurality of groups of convolutional interleaved is written to Nw same row accessing memory units of the M same row accessing memory units, where M is an integer greater than 1, and Nw is a positive integer not greater than M. In this example, the (L−1) sets of convolutional interleaved data is distributed and stored in the Nw same row accessing memory units, the number of sets of data of the $J^{th}$ group of convolutional interleaved data stored in each of the same row accessing memory units is not greater than [int((L−1)/Nw)+1], where int represents an integer operation. Further, a delay depth difference corresponding to two successive sets of convolutional interleaved data is I operation clocks, and the memory address of each set of convolutional interleaved data is determined according to values of L, J and I.

In step S1120, one set of the L sets of convolutional interleaved data is outputted as one set of data of one group of convolutional de-interleaved data, and the (L−1) sets of convolutional interleaved data in Nr same row accessing memory units is accessed through not greater Nr number of row access changes to serve as (L−1) sets of data of that group of convolutional de-interleaved data. The Nr access memory units are included in the M same row accessing memory units, where Nr is a positive integer not greater than M. In this example, Nw is greater than Nr.

Figure 12:
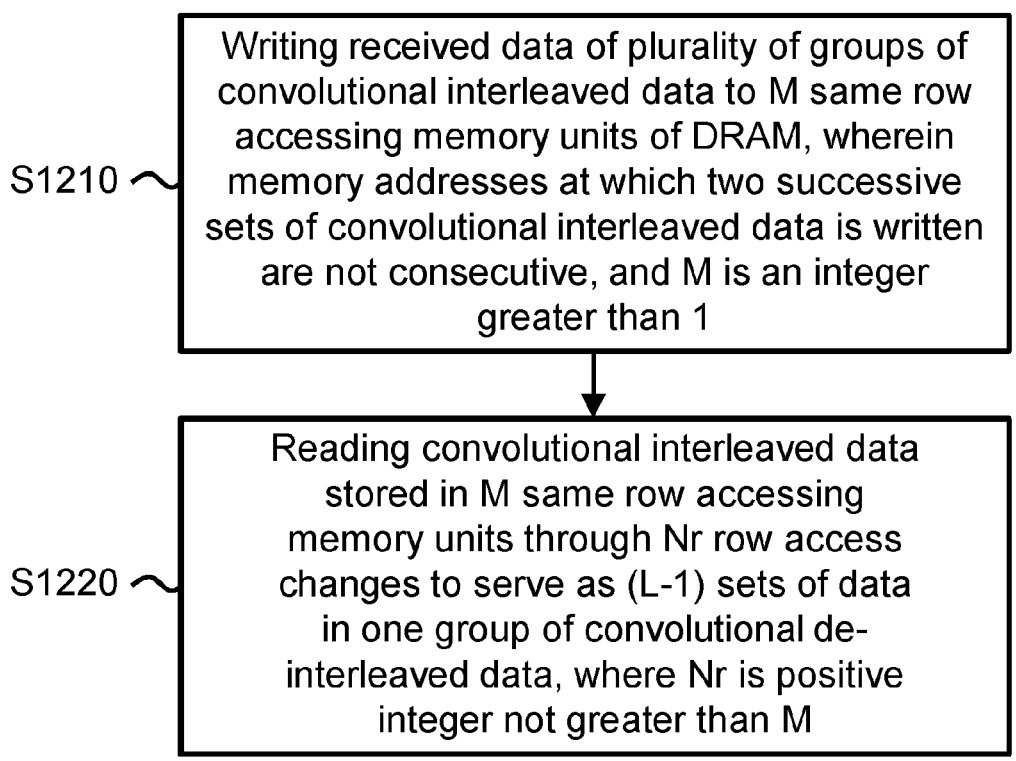
FIG. 12 is a schematic diagram of a convolutional de-interleaving method according to another embodiment of the present invention.

FIG. 12 shows a convolutional de-interleaving method according to another embodiment of the present invention. A plurality of groups of convolutional interleaved data, formed by performing a convolutional interleaving process on a plurality of groups of non-interleaved data, is processed using M same row accessing memory units of a DRAM. Each of the groups of non-interleaved data includes L sets of data, and the plurality of groups of convolutional interleaved data corresponds to L different delay depths, where L is a positive integer. Given the above conditions, the method according to the embodiment includes following steps.

In step S1210, received data of the plurality of groups of convolutional interleaved data is written to the M same row accessing memory units in the DRAM. Wherein, the memory addresses at which two successive sets of convolutional interleaved data is written are not consecutive, where M is an integer greater than 1. In this example, a delay depth difference corresponding to two successive sets of convolutional interleaved data is I operation clocks. The group transmitting sequence of the plurality of groups of non-interleaved data is J (alternatively, each group/set of convolutional interleaved data corresponds to a group receiving sequence J), and the memory address of each set of convolutional interleaved data is determined according to values of L, J and I, where I and J are positive integers.

In step S1220, (L−1) sets of convolutional interleaved data stored in the M same row accessing memory units is read through Nr number of row access changes to serve as (L−1) sets of data of one group of convolutional de-interleaved data, where Nr is a positive integer not greater than M. In the (L−1) sets of data, [(L/Nr)−1] sets of data is stored in one same row accessing memory unit, and the remaining (Nr−1)L/Nr sets of data is evenly stored in (Nr−1) same row accessing memory units.

In conclusion, the convolutional de-interleaver and the convolutional de-interleaving method perform de-interleaving with a DRAM to save hardware costs, and reduce the number of row access changes of a memory through appropriately selecting memory addresses for data access to further improve the performance.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A convolutional de-interleaver, applied to process a plurality of groups of convolutional interleaved data, the groups of convolutional interleaved data comprising a plurality of sets of convolutional interleaved data formed by performing a convolutional interleaving process on a plurality of groups of non-interleaved data, each of the groups of non-interleaved data comprising L sets of data, two successive sets of data in each group of non-interleaved data corresponding to a delay depth difference after the convolutional interleaving process, L being a positive integer, the convolutional de-interleaver comprising:

an input data buffer, that buffers the groups of convolutional interleaved data;

a memory controller, that accesses the groups of convolutional interleaved data buffered in the input data buffer with a memory to perform a convolutional de-interleaving process; wherein, a memory address of each set of convolutional interleaved data stored is determined according to a corresponding delay depth, the value L and the delay depth difference; and an output data buffer, that buffers a plurality of groups of convolutional de-interleaved data read from the memory, wherein the L sets of data of one of the groups correspond to L different delay depths, respectively;

wherein the memory is arranged in a plurality of L×L tiles;

wherein each of the groups of non-interleaved data corresponds to one group transmitting sequence J, J being a positive integer, and the memory address of each set of convolutional interleaved data stored is determined further according to the value J, such that at least one of the L×L tiles comprises a part of the L sets of data corresponding to a same J and the part of the L sets of data are continuous.

2. The convolutional de-interleaver according to claim 1, wherein the delay depth difference is I operation clocks, I is a positive integer, a maximum of the delay depths of the convolutional interleaved data is [(L−1)×I+Q] operation clocks, and Q is an integer not smaller than 0 and represents a minimum of the delay depths.

3. The convolutional de-interleaver according to claim 1, wherein the memory controller reads (L−1) sets of convolutional interleaved data by using N same row accessing units in the memory to serve as (L−1) sets of one of the groups of convolutional de-interleaved data; in the (L−1) sets of convolutional interleaved data, [(L/N)−1] sets of the convolutional interleaved data is stored in one of the N same row accessing memory units, and (N−1)L/N sets of the convolutional interleaved data is stored in (N−1) same row accessing memory units of the N same row accessing units, where N is a positive integer.

4. A convolutional de-interleaver, applied to process a plurality of groups of convolutional interleaved data, the groups of convolutional interleaved data comprising a plurality of sets of convolutional interleaved data, the convolutional de-interleaver comprising:

an input data buffer, that buffers the groups of convolutional interleaved data;

a memory controller, that accesses the groups of convolutional interleaved data buffered in the input data buffer with a memory to perform a convolutional de-interleaving process to obtain a plurality of groups of convolutional de-interleaved data, and stores a plurality of sets of data of the sets of convolutional interleaved data corresponding to a same group of convolutional de-interleaved data of the groups of convolutional de-interleaved data in a plurality of same row accessing memory units in the memory; and an output data buffer, that buffers the convolutional de-interleaved data read from the memory, wherein the sets of convolutional interleaved data is formed by performing a convolutional interleaving process on a plurality of groups of non-interleaved data, each of the groups of non-interleaved data comprises L sets of data, two successive sets of data in each group of the non-interleaved data corresponds to a delay depth difference after the convolutional interleaving process, the delay depth difference is I operation clocks, L and I are positive integers, a maximum of delay depths of the convolutional interleaved data is $[(L-1)\times I+Q]$ operation clocks, and Q is an integer not smaller than 0 and represents a minimum of the delay depths, wherein the L sets of data of one of the groups correspond to L different delay depths, respectively, wherein the memory is arranged in a plurality of L×L tiles, and wherein each of the groups of non-interleaved data corresponds to one group transmitting sequence J, J being a positive integer, a memory address of each set of the convolutional interleaved data is determined according to a corresponding delay depth of the set of data, the value L, the delay depth difference and the value J such that at least one of the L×L tiles comprises a part of the L sets of data corresponding to a same J and the part of the L sets of data are continuous.

5. A convolutional de-interleaving method, applied to process a plurality of groups of convolutional interleaved data, the groups of convolutional interleaved data comprising a plurality of sets of convolutional interleaved data, the convolutional de-interleaving method comprising:

accessing the groups of convolutional interleaved data with a memory to perform a convolutional de-interleaving process to obtain a plurality of groups of convolutional de-interleaved data;

wherein, a plurality of sets of data of the sets of convolutional interleaved data corresponding to a same group of convolutional de-interleaved data of the groups of convolutional de-interleaved data is stored in a plurality of same row accessing memory units in the memory, wherein the sets of convolutional interleaved data is formed by performing a convolutional interleaving process on a plurality of groups of non-interleaved data, each of the groups of non-interleaved data comprises L sets of data, two successive sets of data in each group of the non-interleaved data corresponds to a delay depth difference after the convolutional interleaving process, the delay depth difference is I operation clocks, L and I are positive integers, a maximum of delay depths of the convolutional interleaved data is $[(L-1)\times I+Q]$ operation clocks, and Q is an integer not smaller than 0 and represents a minimum of the delay depths, wherein the L sets of data of one of the groups correspond to L different delay depths, respectively, wherein the memory is arranged in a plurality of L×L tiles, wherein in the step of accessing the groups of convolutional interleaved data with the memory to perform the convolutional de-interleaving process, a memory address of each set of the convolutional interleave data stored is determined according to a delay depth, the value L and the value I, and wherein each of the groups of non-interleaved data corresponds to one group transmitting sequence J, J being a positive integer, and the memory address of each set of the convolutional interleaved data stored is determined further according to the value J, such that at least one of the L×L tiles comprises a part of the L sets of data corresponding to a same J and the part of the L sets of data are continuous.

6. The convolutional de-interleaving method according to claim 5, wherein each of the groups of convolutional de-interleaved data corresponds to L sets of convolutional interleaved data of the sets of convolutional interleave data; (L−1) sets of convolutional interleaved data of the L sets of convolutional interleaved data is stored in N same row accessing memory units in the memory; in the (L−1) sets of convolutional interleaved data, $[(L/N)-1]$ sets of the convolutional interleaved data is stored in one of the N same row accessing memory units, and the rest sets of the convolutional interleaved data is distributed and stored in (N−1) same row accessing memory units of the N same row accessing units, where L and N are positive integers.

* * * * *